UNITED STATES PATENT OFFICE.

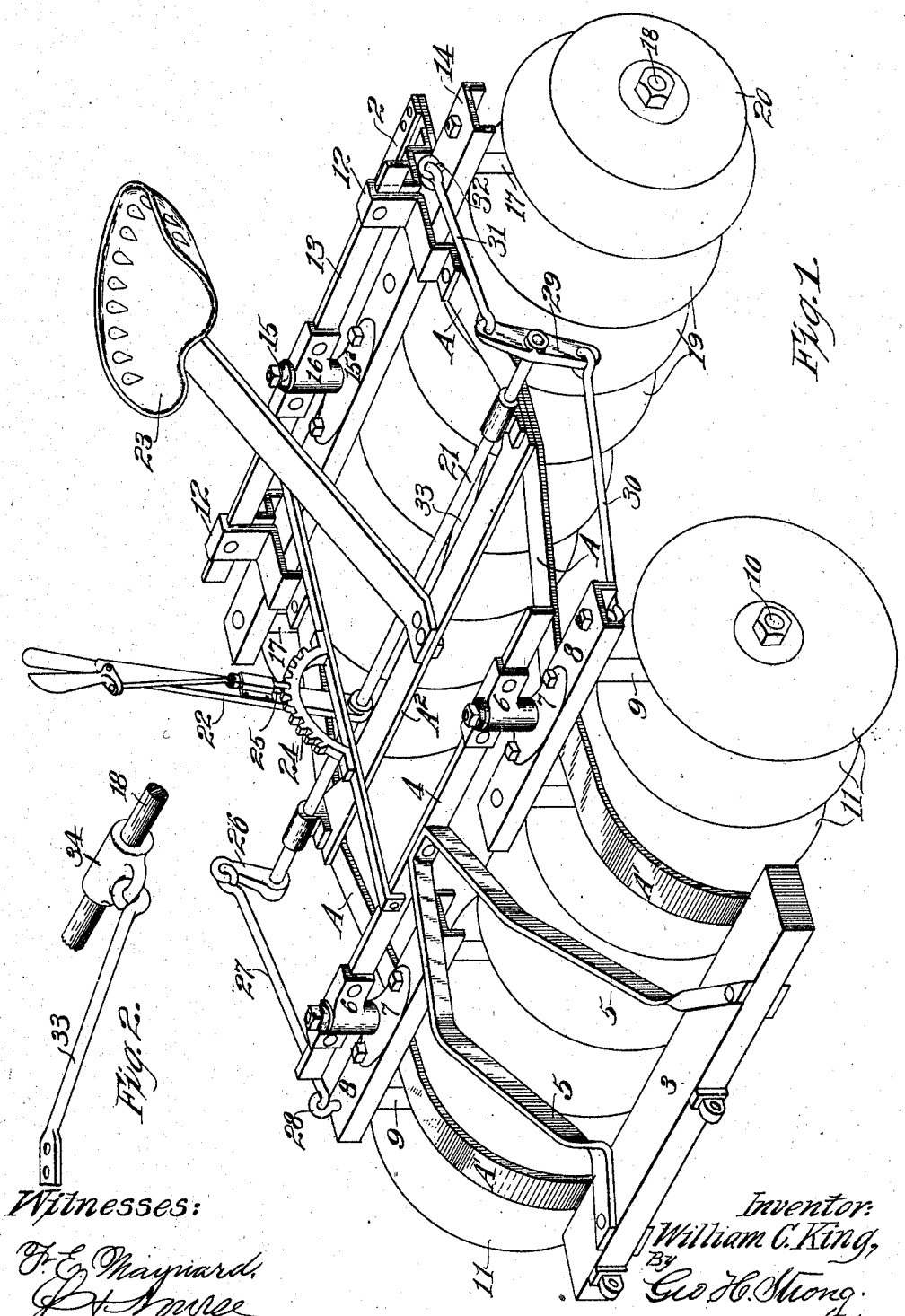

WILLIAM C. KING, OF CAMPBELL, CALIFORNIA, ASSIGNOR OF ONE-HALF TO W. G. AIKEN, OF CAMPBELL, CALIFORNIA.

DISK HARROW.

No. 831,789.     Specification of Letters Patent.     Patented Sept. 25, 1906.

Application filed June 7, 1906. Serial No. 320,603.

*To all whom it may concern:*

Be it known that I, WILLIAM C. KING, a citizen of the United States, residing at Campbell, in the county of Santa Clara and State of California, have invented new and useful Improvements in Disk Harrows, of which the following is a specification.

My invention relates to an apparatus for cultivating the ground.

It consists in the combination of independently-mounted series of disks, means for adjusting the same, and in details of construction which will be more fully explained by reference to the accompanying drawings, in which—

Figure 1 is a perspective view of my apparatus. Fig. 2 is a detail of link connecting with the rear shaft.

The main frame of my apparatus consists of metal side bars A. These bars connect at the rear with the transverse bar 2, and at the front they are curved, as shown at A', and connect with a horizontally-disposed draft-bar 3, to which the pole and team may be attached by any usual or suitable means. Across the front of the machine is a bar 4, and from the center of this bar brace-bars 5 extend downwardly and are secured to the draft-bar 3. Vertically-disposed sockets 6 are secured to the transverse bar 4, and these sockets receive spindles, which have enlarged foot portions 7, by which they are bolted or otherwise secured to the short independent channel-irons 8. Standards 9 are secured within the channel-irons extending downwardly and carrying boxes in which the shafts 10 are supported. Upon these shafts are the two sets of disks 11, and it will be seen from this construction that the two sets of disks being carried by the independent turnable channel-irons 8 may be turned at different angles about their vertical supports.

At the rear of the apparatus are yokes 12, the lower ends of which are secured to the side bars A, and they are connected at the top by a transverse bar 13. The lower part of these yokes form guide-channels within which a channel-iron bar 14 is movable. This bar has a central vertical shaft, as at 15, turnable in a sleeve or box 16, which is fixed to the bar 13, the shaft 15 having an enlarged foot and being bolted or otherwise secured to the channel-iron 14, as at 15ª. By this construction the channel-iron bar being centrally pivoted and movable within the guide-yokes 12 may be swiveled about its center and turned to a distance limited by the length of the guiding portion of the yokes.

To the channel-iron bar 14 standards 17 are fixed, extending downwardly and having at the lower end boxes or supports in which the single shaft 18 is carried. Upon this shaft are mounted the disks 19, extending from end to end of the shaft and separated to such a distance that when the apparatus is drawn over the ground these disks will travel between the lines of travel of the disks 11, and thus thoroughly turn over and pulverize the whole surface in which the apparatus may pass.

I have found by experience that the turning of the disks 11 in two separate series and the disks 19 in one set produces the best results and prevents the apparatus from side movements which cannot be properly controlled. Exterior to the outermost of the disks 19 at the left end of the machine is a disk 20 of smaller diameter—that is, if the disks 19 are sixteen inches in diameter and making a cut of something upward of four inches the disk 20 will be about twelve inches in diameter, so that its edge just reaches the surface of the ground, and it serves to level the ground acted upon by the other disks and prevent the formation of furrows on this line of travel.

In order to turn the disks 11 and 19 to any desired angle and so that the rear disks will travel in the spaces between the lines of travel of the front disk, I have shown a shaft 21, journaled across the side bars A, and here shown as supported upon a transverse bar A², which extends across the central portion of the apparatus. Fixed to this shaft 21 is a hand-lever 22, which is within reach of the driver occupying a seat 23, which seat is supported from the bar A², as shown, and by means of a segment 24 and a pawl 25 the shaft 21 may be turned and locked at any desired position. At the right end of the shaft 21 is a rocker-arm 26, and a rod 27 connects the outer end of this rocker-arm with an eye-bolt 28, which is secured to the right end of the channel-bar 8 at this side of the apparatus. Upon the opposite end of the shaft 21 is fixed a double rocker-arm 29. A rod 30 connects the lower end of this rocker-arm with the left front channel-bar 8, and a rod 31 connects the upper end of the rocker-arm 29 with the left end of the channel-bar 14, this connection being made by means of an eyebolt, as at 32, which passes down through the top of the channel-bar and into the post 17. By this construction it will be seen that when the shaft 21 is turned by pushing the lever 22 forward the right end of the right set of front disks 11 will be pushed forward and the inner end correspondingly retracted by turning the support around its vertical swivel-post, and the rod 30, connecting the lower end of the rocker-arm 29 with the left end of the left front channel-bar 8, will draw the outer end of this channel-bar and the disks supported therefrom so as to stand at a similar angle with the disks at the right.

The connection 31 between the upper end of the rocker-arm 29 and the channel-bar 14 draws the left end of this channel-bar forward and with it the disk-shaft and disks to stand at an angle converging toward the left with relation to the disks 8, thus placing the three sets of disks in the desired relation for properly cultivating the soil.

It will be seen that by reason of the curved bars A' extending upwardly and rearwardly from the draft-bar 3 and connected at the top with the channel-bars 8 a line of draft will be through these channel-bars and will act through the standards 9 upon the disk-shafts and disks 11.

33 is a brace-rod having its front end bolted to the transverse bar A², and its rear end connects by a loose link 34 with the central portion of the rear disk-shaft 18, thus providing a direct line of draft between the frame and these disks, while at the same time allowing a free swiveling motion of said disks as required.

Having thus described my invention, what I claim, and desire to secure by Letters Patent, is—

1. In a harrow, a main frame having side bars and transverse connecting-bars, a pair of transverse swivel-bars at the front, a set of disks carried by each of the said swivel-bars, a draft-bar located in front of the disks, said side bars of the main frame having their front ends extending beyond the swivel-bars and curved downwardly and connecting with the draft-bar, and a centrally-located bracing-frame connecting said draft-bar with the front transverse connecting-bar.

2. In a harrow, two sets of disks and shafts upon which they are mounted, vertically-swiveled channel-iron frames with downwardly-projecting standards upon which the disk-shafts are carried, a single shaft extending across the entire width of the rear portion of the machine, a channeled iron bar with standards, a disk-shaft and disks carried thereby, a central vertical pivot about which the channel-iron bar and rear disks are turnable, guides within which the ends of the bar are movable in a horizontal plane, a rock-shaft and lever and rocker-arms with connecting-rods whereby the front and rear disks are simultaneously turned at angles with each other.

3. In a harrow, a main frame consisting of side bars having the front ends curved downwardly and connecting with the draft-bar, transverse bars, swiveling channel-bars journaled to the main frame, standards extending downwardly from the channel-bars, disk-carrying shafts supported by said standards, mechanism by which the channel-bars and disks are turnable to stand at angles with relation to each other, and a brace-bar having its front end fixed to the main frame and a swivel connection between its rear end, and the rear disk-carrying shaft whereby the pull from the draft-bar is directly from the main frame to the rear disk-shaft.

4. In a harrow, a main frame, two front disk-carrying shafts independently mounted and turnable about vertical axes to stand at angles transverse to the line of travel, a single rear, disk-carrying shaft turnable about a central vertical axis, and guides and stops to limit its movement, and an exterior leveling-disk of smaller diameter than the main disks.

5. An earth cultivating and harrowing device, said device including a main frame having two independently-swiveling disk-carrying shafts at the front, and a single swiveling shaft at the rear, and mechanism by which said shafts are turnable to cause the edges of the rear disks to travel in lines between those of the front disks, and an exterior disk of smaller diameter than the main disks, carried upon the rear disk-shaft.

In testimony whereof I have hereunto set my hand in presence of two subscribing witnesses.

WILLIAM C. KING.

Witnesses:
L. H. CASE,
MARY E. BURNS.